United States Patent [19]
Takahashi et al.

[11] Patent Number: 5,305,033
[45] Date of Patent: Apr. 19, 1994

[54] COMBINATION CAMERA AND FLASHLIGHT

[75] Inventors: Masami Takahashi, 164 Aza Moto-machi, Terano, Shinkawa-cho, Nishikasugai-gun, Aichi-ken; Kuniaki Aoki, Shizuoka, both of Japan

[73] Assignee: Masami Takahashi, Aichi, Japan

[21] Appl. No.: 244

[22] Filed: Jan. 4, 1993

[51] Int. Cl.⁵ .............................................. G03B 29/00
[52] U.S. Cl. ...................................... 354/76; 354/132; 354/165
[58] Field of Search ................... 354/75, 76, 132, 165, 354/354

[56] References Cited
FOREIGN PATENT DOCUMENTS

| 58-15929 | 1/1983 | Japan . |
| 59-131728 | 9/1984 | Japan . |
| 61-149201 | 9/1986 | Japan . |
| 61-151201 | 9/1986 | Japan . |
| 61-162901 | 10/1986 | Japan . |

Primary Examiner—David M. Gray
Attorney, Agent, or Firm—Hickman & Beyer

[57] ABSTRACT

A combination camera and flashlight is disclosed that includes a flashlight portion having an illumination bulb and a camera portion for recording visual information. A mechanism is also provided for automatically turning off the illumination bulb when the shutter is opened.

13 Claims, 6 Drawing Sheets

COMBINATION CAMERA AND FLASHLIGHT

BACKGROUND OF THE INVENTION

The present invention relates generally to a device that combines the functions of a camera and a flashlight. More particularly, a compact combination camera and flashlight is disclosed which prevents picture washout caused by light rays from a flashlight illumination bulb impinging on the aperture of a photographic lens when a picture is taken.

Devices which combine the function of a camera and a flashlight are generally known. Such devices are often marketed to police and/or security operations for use on patrol. The intention is that when a suspect or an incident is observed in the dark, the flashlight portion of the device can be used for illumination. The camera portion of the device may be used to obtain a clear picture of the suspect or incident which in turn can be used for either identification or evidence in future proceedings. The flashlight portion can also be used for illumination during patrols. Of course, there are many other applications for such combined devices as well.

Heretofore, many types of combination camera and flashlights have been proposed. By way of example, such devices are shown in Japanese laid open utility Model Publication Nos. 15929/1983, 131728/1984, 149201/1986, 162901/1986 and 151201/1986. In each of the described devices, the aperture of the photographic lens and the illumination bulb are both arranged generally in a forward region of the device in order to minimize the overall size of the combined camera and flashlight. However, in such devices, the light can remain on when the picture is being taken. When this occurs, light from the illumination bulb often tends to at least partially wash out the picture, which detracts from the overall quality of the picture.

SUMMARY OF THE INVENTION

It is therefore an object of the present invention to overcome the drawbacks of the combination cameras and flashlights described above, by providing a compact device that combines the flashlight and camera functions and which can prevent washout caused by the illumination bulb.

To achieve the foregoing and other objects and in accordance with the purpose of the present invention, a combination camera and flashlight is provided. The device includes an illumination means that has an illumination bulb and a reflecting mirror arranged about the illumination bulb for directing light emanating from the illumination bulb in a generally forward direction. A substantially transparent protecting plate is positioned generally forward of the illumination bulb for protecting the illumination bulb. A camera means is also provided for recording visual information. The camera means includes an aperture and a shutter arranged to open and close the aperture. A mechanism is also provided for automatically turning off the illumination bulb when the shutter is opened.

In a preferred embodiment, the aperture of the camera means is located generally behind the reflecting mirror and the reflecting mirror has a cut-out which exposes the aperture through the protecting plate. In another preferred embodiment, the combination camera and flashlight is further combined with a sound recording apparatus.

With the described device, the illumination bulb is automatically turned off by an operation of the camera's shutter release button. The placement of the aperture of the camera means behind the reflecting mirror in a preferred embodiment facilitates a compact design in a preferred embodiment of the invention. Additionally, in embodiments where a sound recording apparatus is also included, it is possible to record acoustic information in addition to visual information.

BRIEF DESCRIPTION OF THE DRAWINGS

The invention, together with further objects and advantages thereof, may best be understood by reference to the following description taken in conjunction with the accompanying drawings in which:

FIG. 6 is a schematic view showing the interlocking mechanism including the shutter release button, the illumination switch, the strobe switch and the like.

DETAILED DESCRIPTION OF A PREFERRED EMBODIMENT

Figure 1:
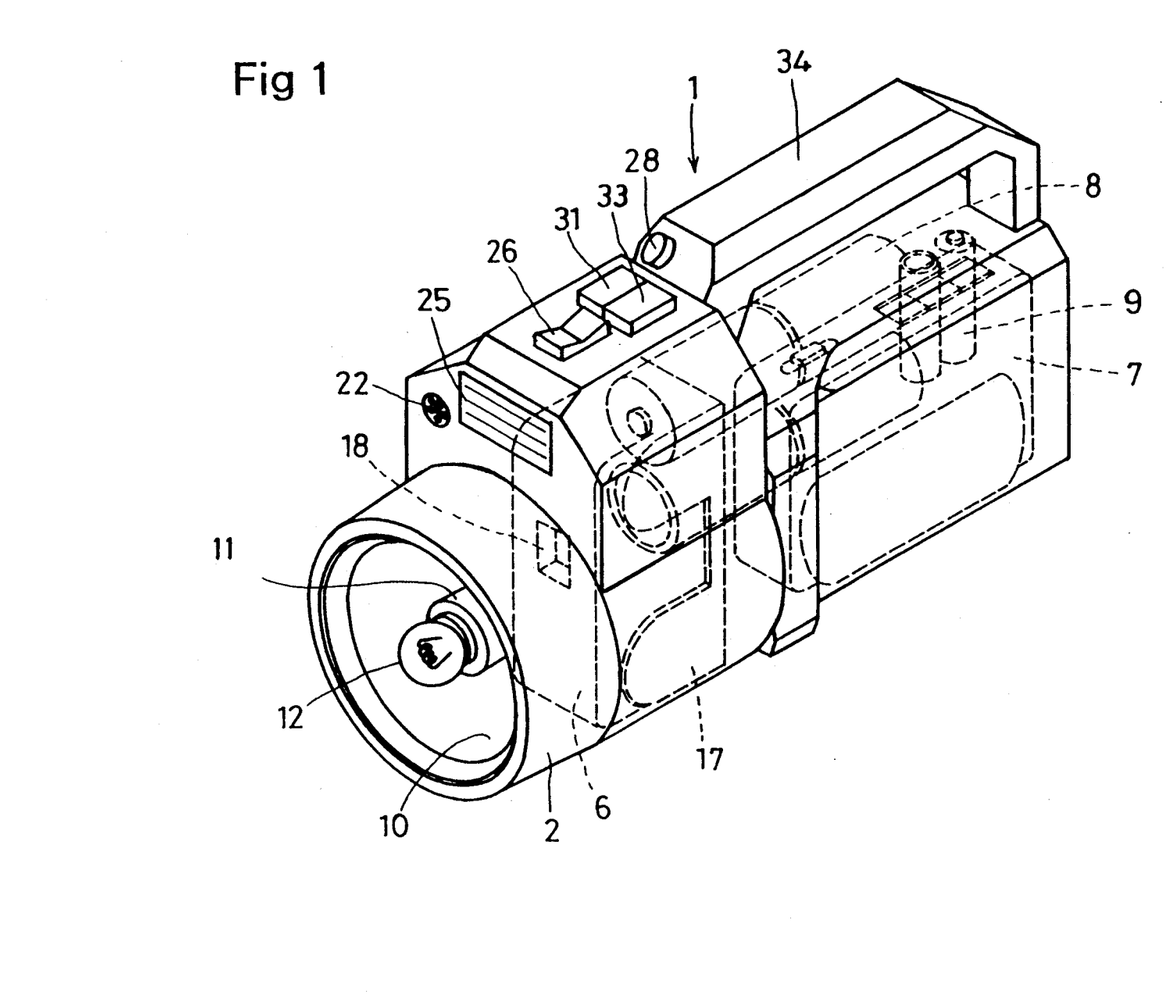
FIG. 1 is a perspective view of a combination camera and flashlight device in accordance with the present invention in which the internal components are shown using dotted lines.
Figure 2:
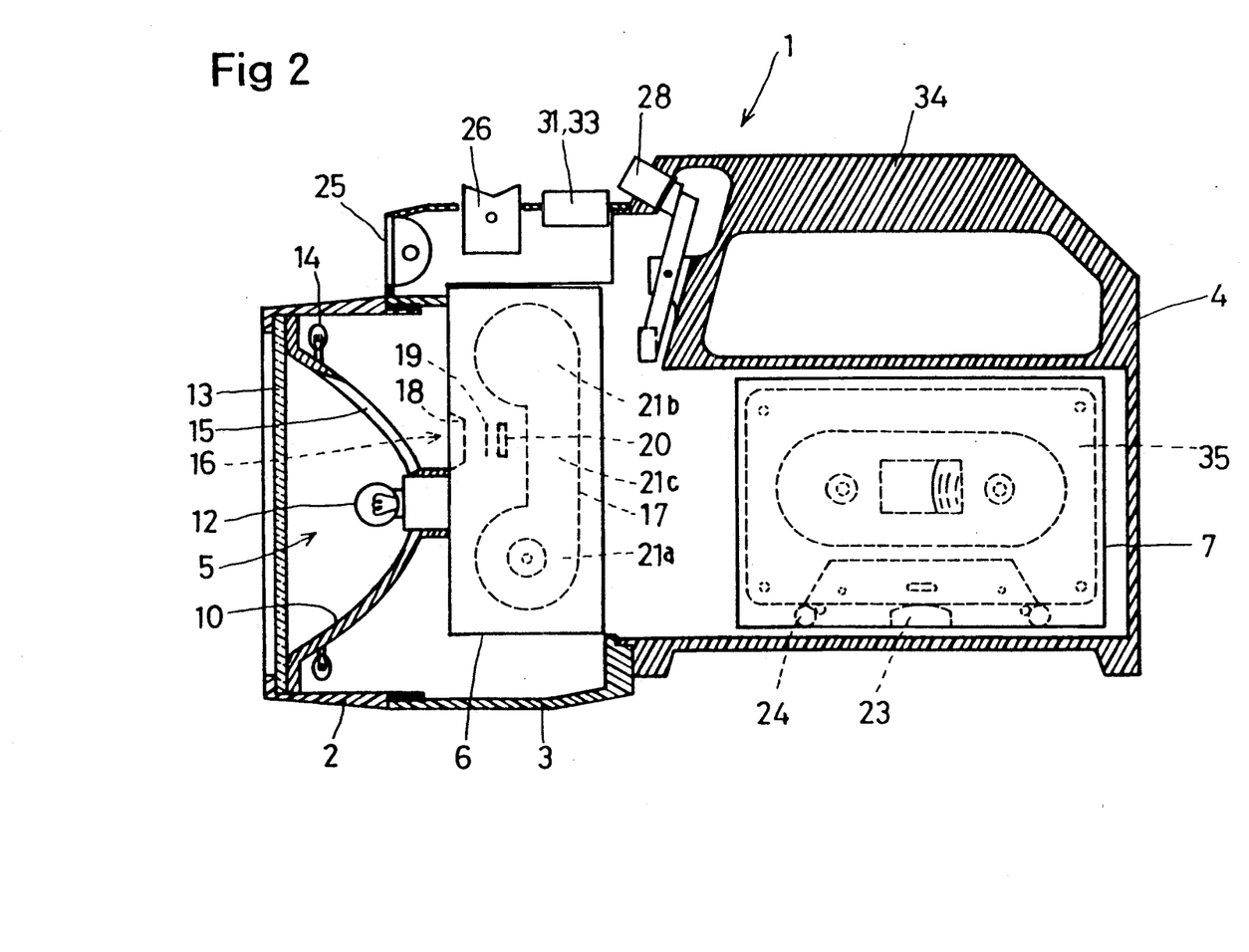
FIG. 2 is a longitudinal cross-sectional view of the combination camera and flashlight device shown in FIG. 1.

A preferred embodiment of the combination camera and flashlight of the present invention will be described hereinafter with reference to the accompanying drawings. As shown in Figs. I and 2, the combination camera and flashlight I includes an illumination bulb cover 2, a main body 3, a rear cover 4 for the main body 3, a supporting plate (not shown) adapted to be mounted on the main body 3 for attaching various components thereon, an illumination portion 5, a camera means 6, a sound recording means 7 and batteries 8 and 9 for powering the device.

Figure 4:
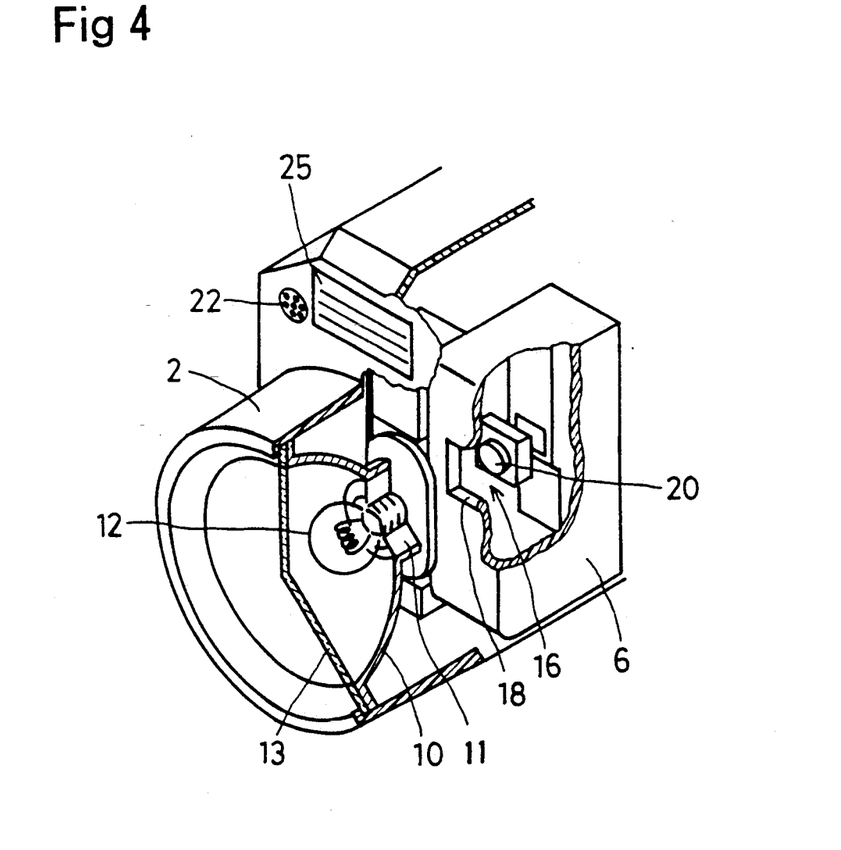
FIG. 4 is a partially broken-away perspective view showing the illumination portion of the combination camera and flashlight device shown in FIG. 1.

The illumination portion 5 includes an illumination bulb 12 that is screwed into a socket 11 that is fitted in a boss in the center of a cup-shaped reflecting mirror 10. The reflecting mirror 10 has a forward concave mirror surface mounted on the supporting plate (not shown). A transparent front protecting plate 13 is sandwiched between a front ring shaped edge of the reflecting mirror 10 and an annular flange located at the distal end of illumination bulb cover 2. The illumination bulb cover 2 is screwed onto the main body 3 in a conventional manner. The separable structure of the cover 2 and the main body 3 enables easy replacement of the bulb 12 when it burns out. It is preferable to arrange an O-ring between the cover 2 and the main body 3 to obtain a fluid tight construction. A plurality of red-colored bulbs 14 are circumferentially arranged at the back of the reflecting mirror 10. The circumferential side face of the illumination bulb cover 2 is transparent or translucent so that the red color of the bulbs 14 is recognizable externally to the flashlight.

Figure 3:
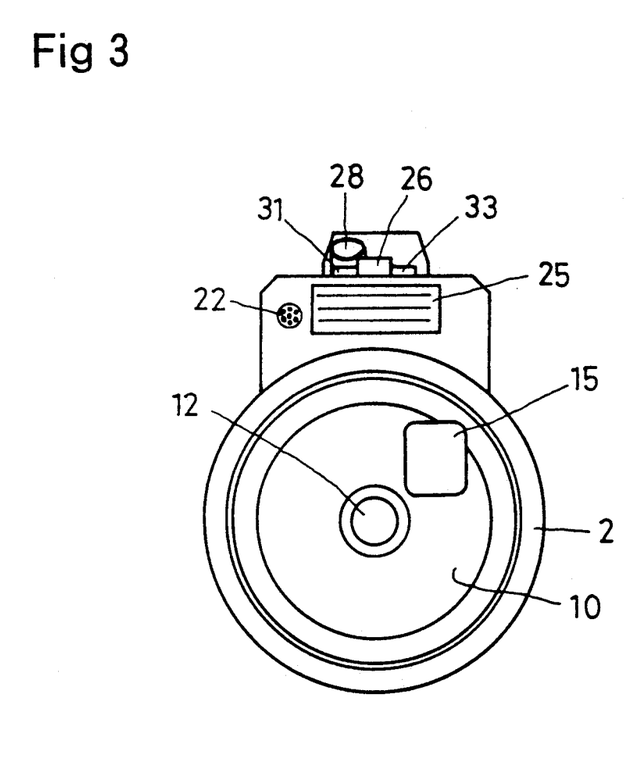
FIG. 3 is a front elevational view of the combination camera and flashlight device shown in FIG. 1.

The camera means 6 is secured on the supporting plate (not shown) behind the illumination portion 5 at a position that is substantially at the center of the space within the main body 3. As is shown in FIGS. 2, 3 and 4, the camera means 6 includes a light receiving portion 16 that faces the front protecting plate 13 through a cut-out 15 formed in the mirror 10. A drive motor (not shown) that drives a film wind-up reel, a circuit board, and other conventional camera components are also provided in the camera means. A film cartridge 17 that contains rolled film can be loaded into the camera means 6. The light receiving portion 16 of the camera means 6 includes an aperture 18, a shutter mechanism 19, and a lens 20.

The film cartridge 17 may take the form of any conventional film cartridge. By way of example, in the embodiment shown, the film cartridge 17 has a cylindrical portion 21a within which a reel of rolled film is contained and a cylindrical portion 21b within which a film wind-up reel is contained. It also contains a guide portion 21c for guiding the film from the film reel to the wind-up reel and a window (not shown) arranged at a position that is aligned with the lens 20 when the film cartridge 17 is loaded in the camera means 6.

The sound recording means 7 is fixedly mounted on the supporting plate at the rear of the camera means 6. The sound recording means 7 is arranged to record sounds and voice signals picked up by a microphone 22 arranged on the main body 3. As shown in FIG. 2, the sound recording device includes a recording head 23, a pinch roller 24, a capstan, a driving motor, a circuit board, and other conventional tape recorder components. The sound recording device may be arranged to utilize any kind of recording media including standard sized cassette tapes or micro cassette tapes.

Batteries 8 are provided to power the illumination bulb 12 while batteries 9 power a strobe (electric flash) 25, a film wind-up drive and the sound recording means 7. Batteries 8 and batteries 9 are all mounted on the supporting plate (not shown) in a space behind the camera means 6 and to the side of the sound recording means 7. Separating the power supplies in the described manner permits normal operation of the strobe 25, the film windup drive and the sound recording means 7 even when the flashlight batteries 8 are exhausted.

Figure 5A:
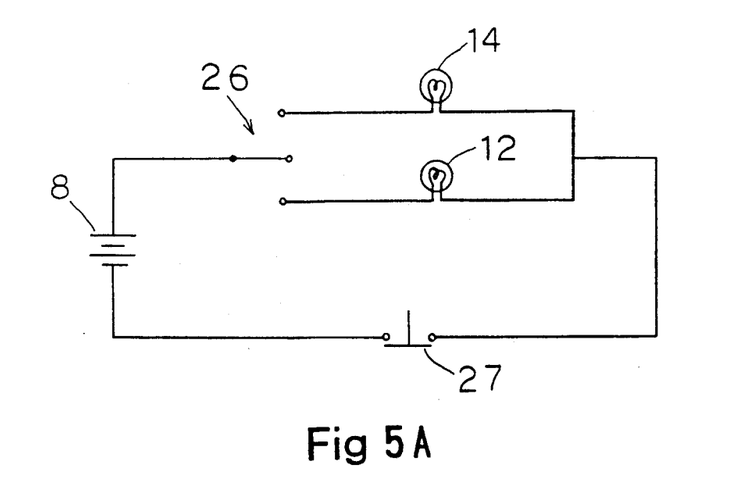
FIGS. 5(a) and 5(b) are schematics of electric circuits suitable for use in the combination camera and flashlight device shown in FIG. 1.
Figure 6:
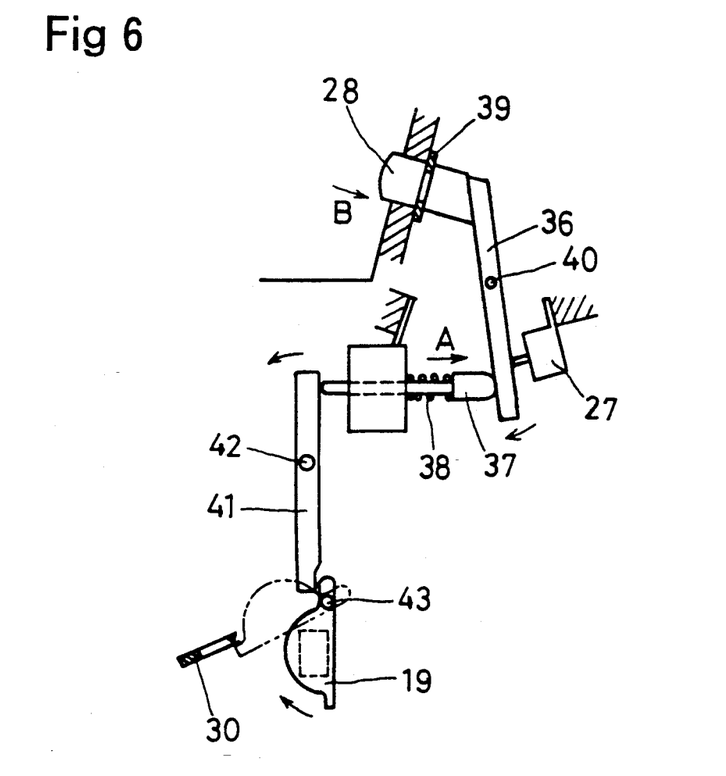

Referring next to FIG. 5, the power supplying circuits will be briefly described. As seen in FIG. 5(a), the first power supply 8 is coupled to the illumination bulb 12 and the red colored bulbs 14 via an illumination switch 26 and an interlocking switch 27. The illumination bulb 12 and the red colored bulbs 14 are arranged in parallel with the illumination switch being provided to permit the user to choose which of the bulbs is (are) to be powered. The interlocking switch 27 is normally closed and is mechanically linked to a shutter release button 28 as is best seen in FIG. 6. The shutter release button 28, in turn is mounted on a handle portion of the combined camera and flashlight as is best seen in FIG. 1. The shutter release button 28 is depressed to take a picture. When the user pushes the shutter release button 28, the interlocking switch 27 is opened, thereby breaking the circuit connecting the power supply 8 to the illumination bulb 12 and/or the red colored bulbs 14. Thus, the bulbs are turned off when a picture is taken.

Figure 5B:
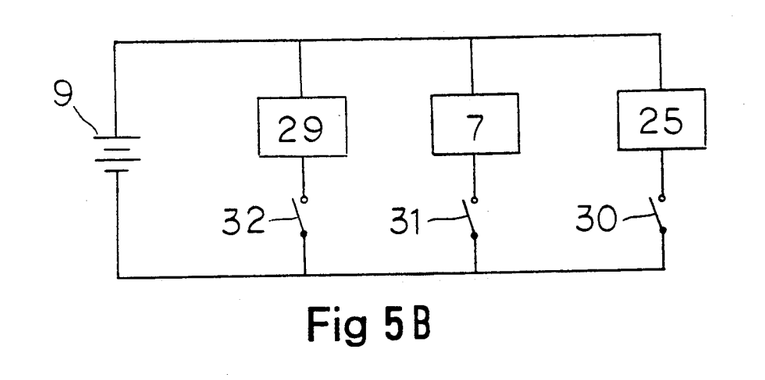

Referring next to FIG. 5(b) the second electrical circuit will be described. In this circuit, the strobe 25, the sound recording means 7 and the film wind-up drive 29 are connected in parallel to the power supply (batteries) 9. A switch is provided to activate each of these components. Thus, the strobe 25 is coupled in series to a strobe switch 30 which as seen in FIG. 6 is also connected to the shutter release button 28. A sound recording means drive switch 31 is connected in series with the sound recording means 7. And, a film wind-up switch 32 is connected in series with the film wind up drive 29.

The strobe 25 and the microphone 22 are mounted on the upper front side of the main body 3 at a position to the rear of the front protecting plate 13. The illumination switch 26, the sound recording drive switch 31 and a cassette release switch 33 are mounted on the upper side of the main body 3. Since the strobe 25 is arranged at a position that is longitudinally behind the front protecting plate 13, light from the strobe does not directly enter the light receiving portion of camera 6. In alternative embodiments, the surface of the strobe may be arranged substantially coplanar with the front protecting plate 13.

A handle 34 is formed integrally with the rear cover 4 at the top thereof and the shutter release button 28 is mounted on the upper front side of the handle 34. With this arrangement, the shutter release button 28 can be easily operated by using a finger of a hand that grips the handle 34. Thus, it is possible to rapidly take pictures which helps prevent the missing of a photo opportunity.

The rear cover 4 is adapted to be fitted on the main body 3. It is preferable to obtain a fluid tight casing structure by providing an O-ring at the connection between the main body 3 and the rear cover 4. This is in addition to providing an O-ring at the connection between the main body 3 and the illumination bulb cover 2 as previously mentioned. Further, conventional seals are preferably provided at each switch mounting location.

The replacement of a cassette tape cartridge 35, the film cartridge 17 and batteries 8 and 9 can easily be carried out by removing the rear cover 4 from the main body 3.

Next, the operation and use of the combination camera and flashlight will be described. To use the device as a normal flashlight, the illumination switch 26 is moved to the rear position, which turns on the illumination bulb 12. The device can be used as a warning device by moving the illumination switch 26 to a forward position which turns off the illumination bulb 12 and turns on the red colored bulbs 14. In essence it is contemplated that with the red colored bulbs turned on, the user can wave the device back and forth or in a circle, which would convey a warning signal. The illumination switch further has a third, neutral position at which both the illumination bulb 12 and the red colored bulbs 14 are turned off. The neutral position may be a center position.

In order to take a photograph using the described device, the user merely depresses the shutter release button 28. The depression of the shutter release button 28 causes actuation of the strobe 25 and the shutter 19 at substantially the same time, thereby recording a picture. Simultaneously, the illumination bulb 12 and/or the red-colored bulbs 14 are turned off. It is noted that if the illumination bulb 12 is left on while the picture is taken, there is a danger that light from the illumination bulb 12 would enter the light receiving portion 16 after being reflected by the front protecting plate 13 or the reflecting mirror 10, thereby at least partially washing out the picture. By turning off the bulbs, such problems can be avoided.

Referring next to FIG. 6, the interlocking mechanism will be described. The shutter release button 28 slidably contacts a first end of a first lever 36. The second end of lever 36 is contacted by a rod 37 which is normally biased in the direction of arrow "A" shown in FIG. 6. by a compression spring 38. The interlocking illumination switch 27 contacts the opposing side of the second end of lever 36. Accordingly, the lever 36 generally pushes the interlocking illumination switch 27 inward to its closed condition (that is, to the right in FIG. 6). At the same time, the shutter release button 28 is biased outward in a direction opposite to the direction of arrow "B" in FIG. 6. An annular clip 39 forms a flange on the shutter release button 28 that limits the amount that the button 28 can extend outward from the casing cover. It also limits the rotational movement of lever 36.

Shutter 19 is biased in a counterclockwise direction (as viewed in FIG. 6) by a coil spring (not shown). With this arrangement, when the shutter release button 28 is depressed in the direction of arrow "B", the first lever 36 rotates in a clockwise direction around a pivot axis 40. This action releases the interlocking switch 27 thereby turning off the bulbs 12 and 14. The clockwise pivotal movement of the first lever 36 also causes the rod 37 to move against the biasing force of the spring 38 (to the left as viewed in FIG. 6). This in turn causes the second lever 41 to pivot counterclockwise about a pivot axis 42. The shutter 19 is then rotated (opened) against the force of a coil spring (not shown) by the second lever 41. Thus a picture is taken. Simultaneously with the opening of the shutter 19, the strobe switch 30 is turned on and the strobe 25 is actuated, thereby providing illumination for the picture.

In the described embodiment, the interlocking mechanism is formed via a mechanical structure. However, it should be appreciated that an electronic control system could be used in the alternative.

When the picture has been taken, the film wind-up switch 23 is actuated and the film wind-up drive (motor) 29 is driven to wind up a length of the spent film onto the wind-up roll located within the film cartridge 17. The film wind-up motion is stopped when a new frame is aligned with the lens 20 and thus the camera means 6 is returned to its stand-by condition.

When the shutter release button 28 is released, the rod 37 is moved in the direction of arrow "A" by the biasing force of the spring 38. Simultaneously, the first lever 36 is pivoted in a counter-clockwise direction, the interlocking illumination switch 27 is returned to an "on" condition, and the combination camera and flashlight I is returned to the condition it was in prior to the depression of the shutter release button 27. That is, either the illumination bulb 12 or the red colored bulbs 14 is (or are) relit. Accordingly, the combination flashlight and camera is automatically returned to the illumination condition after the completion of a picture.

When it is desirable to records sounds occurring in the vicinity of the flashlight 1, the sound recording drive switch 31 is depressed. This causes rotation of a driving motor (not shown) and the actuation of recording head 23 and the pinch rollers 24. Accordingly, the sound signals picked up by microphone 22 are recorded on the recording tape contained within the tape cartridge 35 by the recording head 23. Depression of the release switch 33 stops the sound recording and thus the actions of all structural components in the sound recording means 7 are also stopped.

As can be seen from the described embodiment of the present invention, it is possible to take clear pictures using the self-contained camera. In the embodiment in which the sound recording means is also included, it is possible to record both visual and acoustic information to provide objective evidence that confirms events observed by the user. Since the bulb turning off mechanism is interlocked with the shutter release button, it is possible to prevent washout caused by incident rays from an illumination bulb entering the light receiving portion of the camera when a picture is taken. Additionally, it is possible to make the overall size of the combination camera and flashlight compact since both the illumination bulb and the light receiving portion of the camera are arranged behind the front protecting plate.

The described combination camera and flashlight is particularly well suited for use by guards and/or policemen. When a guard or policeman encounters a suspicious person in the dark, it is possible to instantaneously take a clear picture of the person to be used as evidence in the future.

Although only a few embodiments of the present invention have been described, it should be understood that the present invention may be modified and embodied in many other specific forms without departing from the spirit or scope of the invention. For example, an alarm buzzer can be added to the combination camera and flashlight. Alternatively a radio transmitter can be added so that the user is able to communicate with a home base.

In the described embodiments, the illumination bulb is turned off when taking a picture. However, in an alternative embodiment, the luminous intensity of the illumination bulb could be simply reduced when taking a picture. Therefore, the present examples are to be considered as illustrative and not restrictive, and the invention is not to be limited to the details given herein, but may be modified within the scope of the appended claims.

We claim:

1. A combination camera and flashlight comprising:
   a flashlight illumination means including an illumination bulb, a power supply means for powering the illumination bulb and a reflecting mirror arranged about the illumination bulb for directing light emanating from the illumination bulb in a generally forward direction;
   camera means for recording visual information, the camera means including an aperture and a shutter arranged to open and close the aperture;
   a casing for enclosing the camera means and the illumination means, the casing having a forward facing first opening;
   a substantially transparent protecting plate that covers said first casing opening, the protecting plate being positioned generally forward of the illumination bulb for protecting the illumination bulb;
   cutout means for actuating the shutter and automatically turning of the illumination bulb when the shutter is actuated.

2. A combination camera and flashlight as recited in claim 1 wherein the aperture of the camera means is located generally behind the reflecting mirror and the reflecting mirror has a cut-out which exposes the aperture through the protecting plate such that the light entering said aperture from an external source must pass through the transparent protecting plate.

3. A combination camera and flashlight as recited in claim 1 further comprising a strobe light positioned within the casing at a location to the rear of the front protecting plate such that light generated by said strobe light can not pass directly through said protecting plate, the strobe light being visible through a second opening in the casing.

4. A combination camera and flashlight as recited in claim 3 wherein:
the cutout means includes a shutter release button mounted on said camera casing at an accessible position and adapted for actuation by a user and an interlocking mechanism that couples the shutter release button to the shutter to actuate the shutter when the shutter release button is actuated; and
the strobe light is actuated by the interlocking mechanism when the shutter release button is actuated.

5. A combination camera and flashlight as recited in claim 1 wherein the cutout means includes:
a shutter release button mounted on said casing and adapted for actuation by a user to take a picture;
an interlocking mechanism for mechanically coupling the shutter release button to the shutter to actuate the shutter when the shutter release button is actuated; and
an illumination switch arranged such that it is mechanically opened by the interlocking mechanism when the shutter release button is actuated.

6. A combination camera and flashlight as recited in claim 5 further comprising a strobe received within said casing and a strobe switch, the strobe switch being mechanically activated by the interlocking mechanism such that the strobe is actuated when the shutter release button is actuated.

7. A combination camera and flashlight as recited in claim 1 further comprising:
means for generating a red light, the red light generating means including a plurality of warning bulbs that may be lit independently of the illumination bulb; and
wherein the cutout means automatically turns off the warning bulbs when the shutter is opened.

8. A combination camera and flashlight as recited in claim 1 further comprising a sound recording means that may be selectively actuated by a user, the sound recording means being positioned within said casing and having a control button mounted on said casing.

9. A combination camera and flashlight as recited in claim 8 wherein the sound recording means includes a microphone that is mounted on a forward facing portion of the casing.

10. A combination camera and flashlight comprising:
a flashlight illumination means including an illumination bulb, a power supply means for powering the illumination bulb and a reflecting mirror arranged the illumination bulb for directing light emanating from the illumination bulb in a generally forward direction;
camera means for recording visual information, the camera means including an aperture and a shutter arranged to open and close the aperture;
a casing for enclosing the camera means and the illumination means, the casing having a forward facing first opening;
a substantially transparent protecting plate that covers said first casing opening the protecting plate being positioned generally forward of the illumination bulb for protecting the illumination bulb;
cutout means for actuating the shutter and automatically reducing the illumination intensity of the illumination bulb by a substantial amount when the shutter is actuated.

11. A combination camera and flashlight comprising a casing;
an illumination bulb;
a reflecting mirror received within the casing and arranged about the illumination bulb for directing light emanating from the illumination bulb in a generally forward direction, the reflecting mirror having a cut-out therein;
a substantially transparent protecting plate supported by the casing and positioned generally forward of the illumination bulb for protecting the illumination bulb;
camera means received within the casing for recording visual information, the camera means including,
an aperture located generally behind the reflecting mirror such that the cut-out and the protecting plate expose the aperture in a generally forward direction such that light entering the aperture must pass through the cut-out and the protecting plate, and
a shutter arranged to open and close the aperture;
a strobe light received within the casing and positioning at a location to the rear of the front protecting plate such that light generated by the strobe light can not directly enter the aperture; and
cutout means for automatically turning off the illumination bulb when the shutter is opened, the cutout means including,
a shutter release button mounted on the casing and adapted for actuation by a user to take a picture,
an interlocking mechanism that couples the shutter release button to the shutter to actuate the shutter when the shutter release button is actuated,
an illumination switch arranged such that it is mechanically opened by the interlocking mechanism when the shutter release button is actuated, and
wherein the strobe light is actuated by the interlocking mechanism when the shutter release button is actuated.

12. A combination camera and flashlight as recited in claim 11 further comprising:
means for generating a red light, the red light generating means including a plurality of warning bulbs that may be lit independently of the illumination bulb; and
wherein the cutout means automatically turns off the warning bulbs when the shutter is opened.

13. A combination camera and flashlight as recited in claim 11 further comprising a sound recording means received within said casing that may be selectively actuated by a user, the sound recording means including a microphone that is mounted on a forward facing portion of the casing.

* * * * *

UNITED STATES PATENT AND TRADEMARK OFFICE
CERTIFICATE OF CORRECTION

PATENT NO. : 5,305,033
DATED : April 19, 1994
INVENTOR(S) : Masami Takahashi et al.

It is certified that error appears in the above-indentified patent and that said Letters Patent is hereby corrected as shown below:

Column 8, lines 34 - 35, change "positioning" to --positioned--.

Signed and Sealed this

Sixth Day of September, 1994

BRUCE LEHMAN

Attest:

*Attesting Officer*     *Commissioner of Patents and Trademarks*